United States Patent
McCoy et al.

(10) Patent No.: US 9,426,510 B2
(45) Date of Patent: Aug. 23, 2016

(54) METHOD AND APPARATUS FOR SEARCHING OVER A NETWORK

(75) Inventors: Charles McCoy, Coronado, CA (US); Ling Jun Wong, Escondido, CA (US); True Xiong, San Diego, CA (US)

(73) Assignees: SONY CORPORATION, Tokyo (JP); SONY NETWORK ENTERTAINMENT INTERNATIONAL LLC, Los Angeles, CA (US)

( * ) Notice: Subject to any disclaimer, the term of this patent is extended or adjusted under 35 U.S.C. 154(b) by 737 days.

(21) Appl. No.: 13/077,695

(22) Filed: Mar. 31, 2011

(65) Prior Publication Data

US 2012/0210365 A1  Aug. 16, 2012

Related U.S. Application Data

(60) Provisional application No. 61/442,025, filed on Feb. 11, 2011.

(51) Int. Cl.
| | |
|---|---|
| H04N 5/445 | (2011.01) |
| H04N 21/258 | (2011.01) |
| H04N 21/232 | (2011.01) |
| H04N 21/262 | (2011.01) |
| H04N 21/435 | (2011.01) |
| H04N 21/436 | (2011.01) |
| H04N 21/472 | (2011.01) |
| H04N 21/475 | (2011.01) |

(Continued)

(52) U.S. Cl.
CPC ....... *H04N 21/25875* (2013.01); *H04N 21/232* (2013.01); *H04N 21/26258* (2013.01); *H04N 21/435* (2013.01); *H04N 21/43615* (2013.01); *H04N 21/472* (2013.01); *H04N 21/4753* (2013.01); *H04N 21/4126* (2013.01); *H04N 21/432* (2013.01)

(58) Field of Classification Search
USPC ...................................... 725/37–61
See application file for complete search history.

(56) References Cited

U.S. PATENT DOCUMENTS 5,956,024 A * 9/1999 Strickland et al. ............ 715/717
6,130,726 A * 10/2000 Darbee et al. ................. 348/734

(Continued)

FOREIGN PATENT DOCUMENTS

| CN | 101351797 | 1/2009 |
|---|---|---|
| CN | 101442462 | 5/2009 |
| CN | 101507270 | 8/2009 |

OTHER PUBLICATIONS

AT&T's U-verse app now on more Android devices, including LG Thrive, LG Phoenix and Samsung Infuse. pp. 1-5, Jul. 19, 2011.

(Continued)

*Primary Examiner* — Nicholas Corbo
(74) *Attorney, Agent, or Firm* — Frommer Lawrence & Haug LLP; William S. Frommer

(57) ABSTRACT

A method and apparatus for performing global searching using second display devices. In an IPTV system, a second display application is typically a more complex application. There are typically many features, which increase complexity when a user attempts to find an asset, a service, a utility, a shortcut, or other information and/or content of the second display application. The use of a global search tool enhances the usage of the second display application, especially when a utility is buried in the second display application, making that utility more difficult to access.

28 Claims, 6 Drawing Sheets

(51) Int. Cl.
*H04N 21/41* (2011.01)
*H04N 21/432* (2011.01)

(56) References Cited

U.S. PATENT DOCUMENTS

| | | | |
|---|---|---|---|
| 7,801,303 B2* | 9/2010 | Dulac | 380/200 |
| 2004/0158875 A1* | 8/2004 | Van Der Meulen | 725/133 |
| 2004/0177063 A1* | 9/2004 | Weber et al. | 707/3 |
| 2007/0006129 A1* | 1/2007 | Cieslak et al. | 717/104 |
| 2007/0083897 A1* | 4/2007 | Brownell | 725/61 |
| 2007/0162502 A1* | 7/2007 | Thomas et al. | 707/104.1 |
| 2008/0155614 A1* | 6/2008 | Cooper et al. | 725/91 |
| 2009/0083808 A1* | 3/2009 | Morrison | 725/87 |
| 2009/0138921 A1* | 5/2009 | Miyata | 725/80 |
| 2011/0313775 A1* | 12/2011 | Laligand et al. | 704/275 |
| 2012/0017250 A1* | 1/2012 | Tirasirikul et al. | 725/85 |

OTHER PUBLICATIONS

Office Action issued in corresponding Chinese application No. 20121002323247.6 dated Dec. 23, 2013.

Office Action issued in corresponding Chinese application No. 201210023247.6 dated Aug. 14, 2014 and the English translation.

* cited by examiner

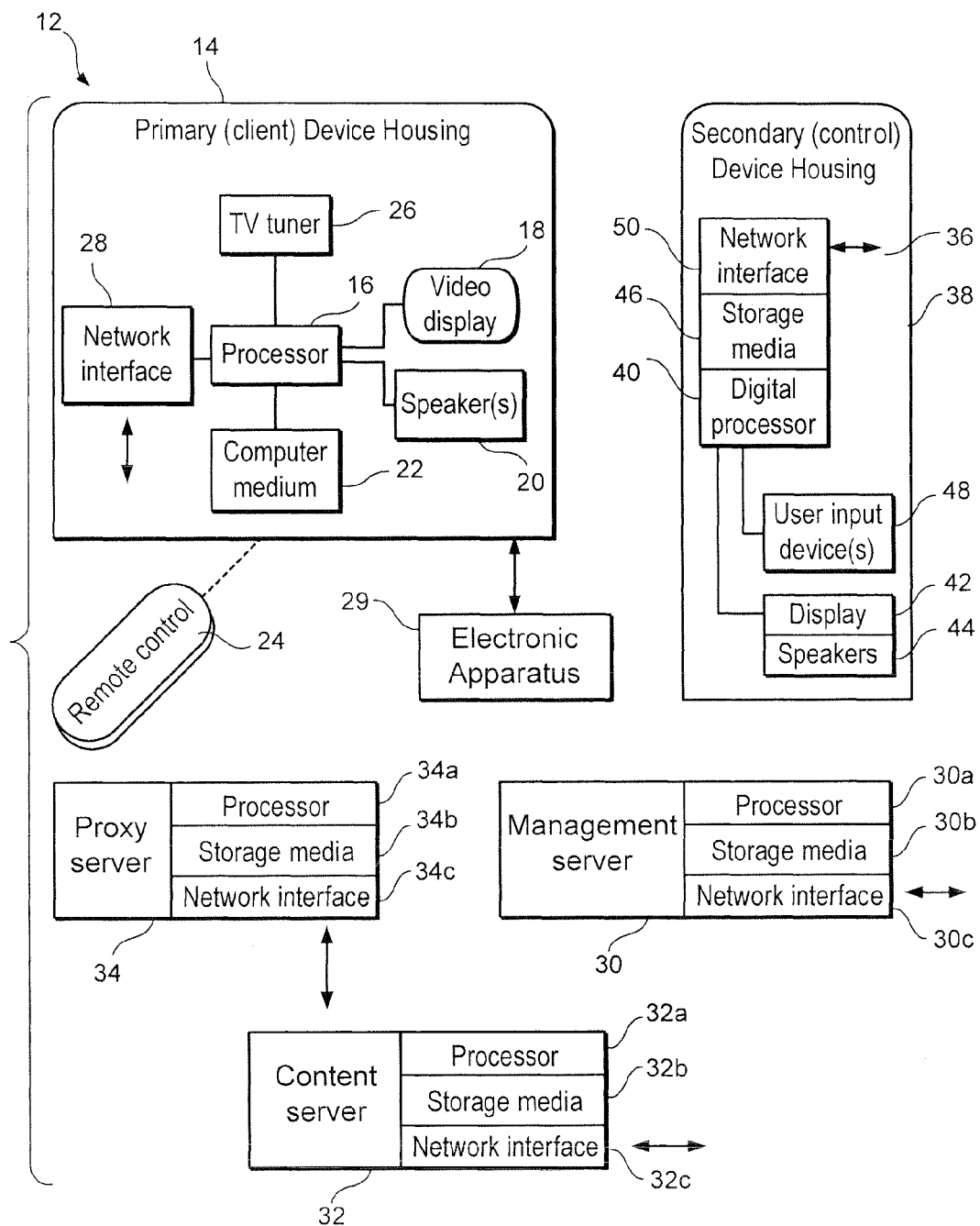
F I G. 1

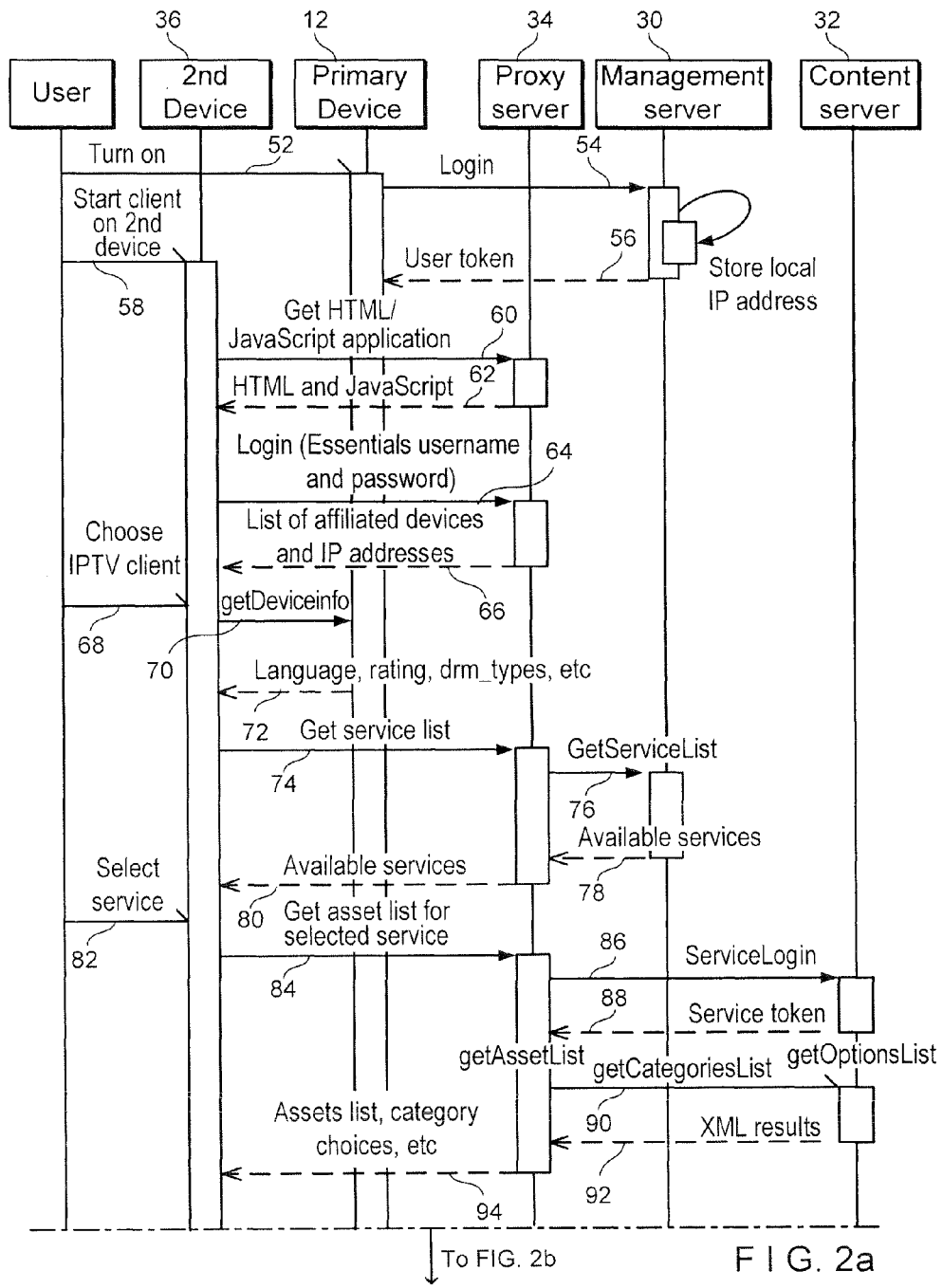
F I G. 2a

METHOD AND APPARATUS FOR SEARCHING OVER A NETWORK

CLAIM TO PRIORITY

This application claims the benefit of previously filed provisional application U.S. Ser. No. 61/442,025 filed Feb. 11, 2011, which is hereby incorporated by reference in its entirety herein

BACKGROUND

1. Field of the Invention

This invention relates generally to a system and method of controlling one device capable of accessing Internet Protocol Television (IPTV) using a second device and more specifically to searching over a network.

2. Background Discussion

IPTV is capable of receiving services delivered using the architecture and networking methods of the Internet Protocol Suite as well as services delivered using a broadcasting network. IPTV services include, for example, live television, time-shifted programming, video on demand (VOD), and on-line transactions.

SUMMARY

One embodiment of the present invention is directed to a method and apparatus for performing global searching using internet video enabled devices. In an IPTV system, a second display application is typically a more complex application. There are usually many features, which causes increased complexity when a user attempts to find an asset, a service, a utility, a shortcut, or other information and/or content of the second display application (app). Therefore, having a global search tool greatly enhances the utility of the second display application, especially when a utility is buried in the second display application, making that utility more difficult to access.

Another embodiment of the present invention is directed to a method in which a user accesses a first IPTV device and a second device, or display device, which may, or may not be an IPTV device. The second device is able to run a second display application. The second device is used to search assets, service, shortcuts and utilities from anywhere in the app. The respective search results are provided in the returned search list. This feature is a one-stop area to maneuver around and through the second display application. This searching feature enhances the user experience of the application.

According to another embodiment of the present invention, the user can utilize a search tool on a second display, which may be associated with the second device, without disturbing the content playing on the first IPTV device.

Other embodiments of the present invention include the methods described above but implemented using apparatus or programmed as computer code to be executed by one or more processors operating in conjunction with one or more electronic storage media.

BRIEF DESCRIPTION OF THE DRAWINGS

To the accomplishment of the foregoing and related ends, certain illustrative embodiments of the invention are described herein in connection with the following description and the annexed drawings. These embodiments are indicative, however, of but a few of the various ways in which the principles of the invention may be employed and the present invention is intended to include all such aspects and their equivalents. Other advantages, embodiments and novel features of the invention may become apparent from the following description of the invention when considered in conjunction with the drawings. The following description, given by way of example, but not intended to limit the invention solely to the specific embodiments described, may best be understood in conjunction with the accompanying drawings, in which:

FIG. 1 shows a block diagram of one embodiment of the present invention.

DETAILED DESCRIPTION

Figure 2B:
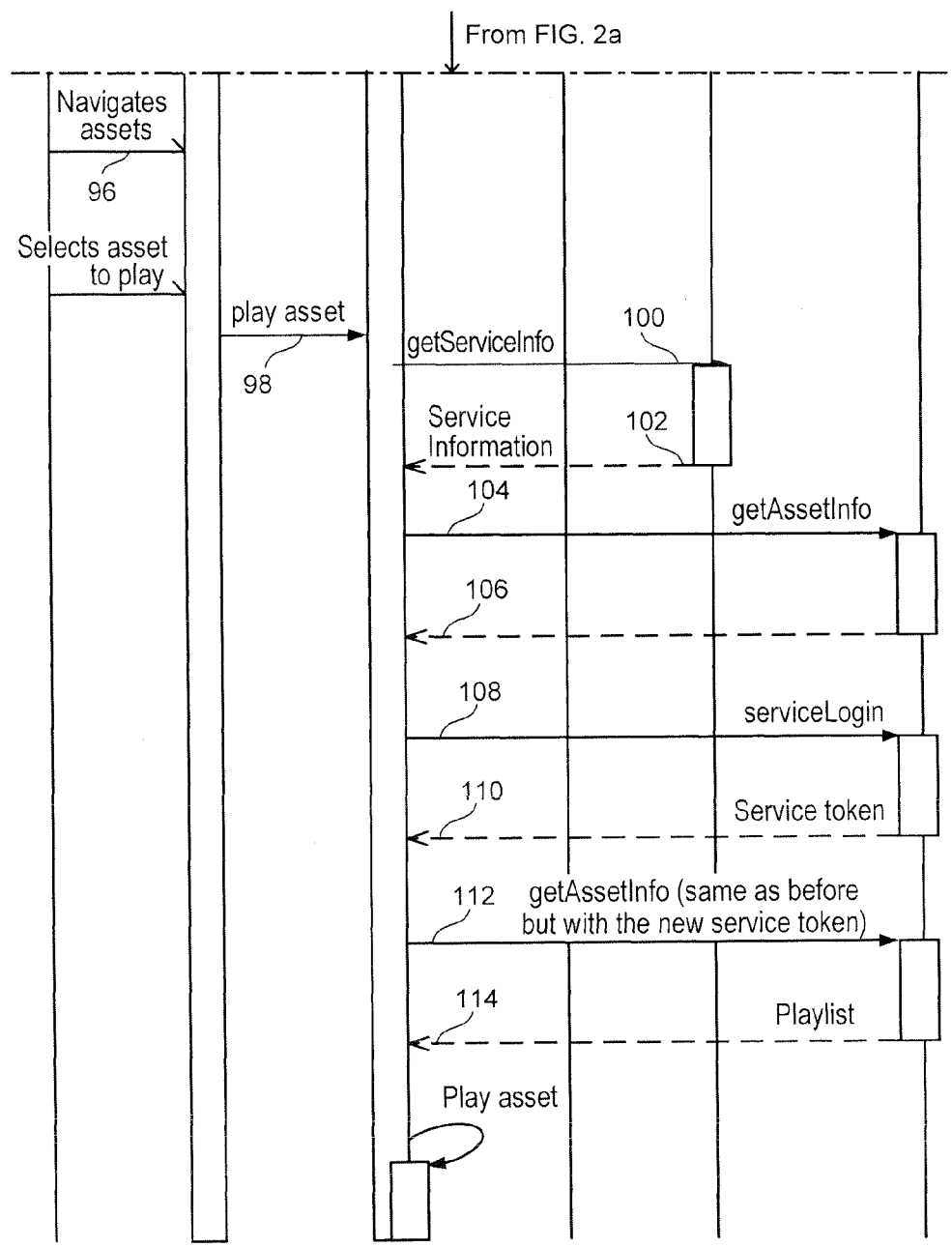
FIG. 2 shows a series of steps according to an embodiment of the present invention.

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the detailed description describes various embodiments of the present invention for illustration purposes and embodiments of the present invention include the methods described and may be implemented using one or more apparatus, such as processing apparatus coupled to electronic media. Embodiments of the present invention may be stored on an electronic media (electronic memory, RAM, ROM, EEPROM) or programmed as computer code (e.g., source code, object code or any suitable programming language) to be executed by one or more processors operating in conjunction with one or more electronic storage media.

Embodiments of the present invention may be implemented using one or more processing devices, or processing modules, or facilities. The processing devices, or modules, or facilities may be coupled such that portions of the processing and/or data manipulation may be performed at one or more processing devices and shared or transmitted between a plurality of processing devices.

An IPTV device may be used to control home appliances through IPTV. These home appliances include, for example, video players, game players, home theater systems, digital video recorders, air conditioners, and etc. Household electrical appliances and audio-visual apparatuses, such as video cassette recorders (VCRs), televisions, air conditioners, and lighting apparatuses, may be furnished with remote controls. These remote controls each have operation units and functions specific to each apparatus. In order to control home appliances, a dedicated remote control may be placed in a vicinity of an associated home appliance. IPTV provides the ability to integrate different functions or different applications into a single control device to control multiple appliances. This single control device may be a smart phone, a digital personal assistant, a personal computer, lap top computer, tablet, or other device with adequate processing and/or storage capabilities. The single control device may transmit control signals through a public network or Internet or other network of operatively coupled computers, or processing devices or modules to an IPTV device, which uses the control command to control home appliances.

An IPTV device can access a vast pool of contents provided by numerous content providers. The IPTV device may also be used to control further distribution of content that has been provided by a third party to the IPTV device so that unauthorized access is prevented. Typically, IPTV is controlled by a single input device and has a single display device. As a shared device that is viewed by several users it is helpful to permit this sharing without excessively raising hardware costs.

Accordingly, a method is provided to enable a user browsing content on a second device to have their selection played by a first device. The user can then continue to browse the content on any number of second devices without interrupting the content that is playing on the first device. The first device may be an IPTV device. The second device may be another electronic device. The method include an architecture design and implementation that allows a user to navigate, browse, and search content on a second device that may be a consumer electronic device such as a Sony Ericsson® smart phone, VAIO® PC, VAIO® laptop, Mylo®, personal computer, or other apparatus with sufficient processing and storage capability, or any device with a web browser. Concurrently, while a user is using the first device, another user can perform these activities on the second device and send a media selection to the first device of the user's choice for playback A second device, also referred to as a secondary device and/or a secondary display device, and typically includes a second display module or display screen associated with the second device or secondary device, performs manipulating functions such as searching, content playback, browsing (when operable with a web browsing application) and may also act as a visual aid to the IPTV. Utilization of a secondary device is a low cost solution which opens up a huge window of business and technical opportunities for use with one or more IPTV devices. It is a favorable complement to the IPTV device(s) because the secondary device has strengths in data entry, processing power and user experience in content management. Thus, users will be able to use their personal devices, such as a cellphone, to browse content in their own language, perform data entry, search for content, manage their content, perform transactions and personalize their experience without disturbing the big screen of a first device. Users only send the content for playback on the IPTV when they are ready to watch it; and playback of proprietary content does not occur on the non-authentic device so security risks are minimized. The program may be written in any suitable programming language with desired functionality, e.g., Java-Script, HTML, or other programming language with the desired functionality, which can be loaded by any device with a browser, or an application written in languages which may not be run in a web browser, such as C, C++, Java, etc., hence not limited to only a small set of compatible devices.

An IPTV system typically includes an IPTV client device and an IPTV client processor for controlling a video display to present content thereon. The system also includes a second device including a control processor and a management server communicating with the IPTV client over the Internet or other suitable network. The management server and IPTV client communicate with at least one content server such that the content server provides audio video content to the IPTV client for presentation of the content on the video display of the IPTV client. The system further includes a proxy server communicating with the management server and the second device. The IPTV client sends login information to the management server which returns to the IPTV client an IPTV session token that may subsequently be presented by the IPTV client device to a the content server to obtain content from the content server. The management server receives and stores a local IP address of the IPTV client, which may include, for example Uniform Resource Indicator (URI) or Uniform Resource Locator (URL) or a network location or network address. The management server can also store an external IP address, which allows communication from a secondary device, which is outside the network, to the IPTV device. Responsive to the second device sending a request to the proxy server for an executable utility, the proxy server returns the utility to the second device. Further, the second device, executing the utility, prompts a user to input to the second device login information. The proxy server, responsive to reception of correct login information from the second device, returns the local IP address of the IPTV client to the second device. The second device uses the local IPTV address to access the IPTV client directly to request information about the IPTV client, which information is returned from the IPTV client to the second device such that the local address of the IPTV client need not be globally addressable. Also the second device sends the information about the IPTV client to the proxy server, requesting a list of services available to the IPTV client from one or more content servers. The proxy server relays the request for a list of services to the management server, which returns the list to the proxy server, with the proxy server in turn sending the list to the second device for presentation of information on the video display. Responsive to a user selection of an element on the list, the second device sends a request for a software asset corresponding to the element to the proxy server. The proxy server requests a service login of the content server providing the asset, and the content server provides to the proxy server a list of assets or categories or services which relays the list to the second device, which is presented on the video display of the second device so that the user can navigate to enter a selection. Responsive to the selection the second device sends a command to the IPTV client to play the selection.

Embodiments include the IPTV client requests of the management server information about the selection received from the second device. The information is returned from the management server to the IPTV client to enable the IPTV client to play content associated therewith. If desired, the proxy server can request of the content server a list of options, and the list is returned to the proxy server. Asset information may be requested by the IPTV client and returned thereto by the content server. Also, a service login received from the second device may be sent by the IPTV client to the content server and a service token returned to the IPTV client in response. When a list of contents is sent to the second device, URL of contents may be removed from the list. The second device requests a content using a unique identifier of the content, the proxy server or the management server may use the unique identifier of the content to locate a corresponding URL of the content. In this way, the second device may not obtain the URL of content so that unauthorized distributions of content are effectively prevented.

According to an embodiment of the present invention, a consumer electronic device (CE) may act as a second device, which includes a housing holding a display, a network interface, and a processor controlling the display and communicating with the Internet through the network interface. An input device communicates with the processor. The processor executing logic includes sending login information to a proxy server, and receiving from the proxy server, responsive to reception thereby of correct login information, a local IP address of an IPTV client. The processor uses the local IPTV address to access the IPTV client directly to request information about the IPTV client, sending the information about the IPTV client to the proxy server. Responsive to sending the information about the IPTV client to the proxy server, the processor receives content information, presenting it on the display from which a user can select a selected content. The processor commands the IPTV client to play the selected content.

According to an embodiment of the present invention, a proxy server assembly includes at least one processor and at least one network interface communicating with the processor to establish communication between the processor and a wide area network.

According to an embodiment of the present invention, at least one computer readable storage medium is accessible to the processor and bears logic causing the processor to receive login information from a second device. Responsive to a determination that the login information is correct, the server sends to the second device a local IP address of an IPTV client associated with the login information. The server receives from the second device information about the IPTV client requesting a list of services available to the IPTV client from at least one content server and sends a request for the list of services to a management server. The proxy server receives from the management server the list and sends it to the second device for presentation of information on a video display thereof. The proxy server then receives from the second device a request for a software asset and responsive to the request for the software asset, requests a service login of the content server. The proxy server receives back from the content server a list of assets or categories or services and sends the list to the second device. In this way, the list can be presented on a video display of the second device so that a user can navigate to enter a selection to command the IPTV client to play the selection.

According to an embodiment of the present invention, a first device is connected with a plurality of electronic devices. A second device may transmit control commands to the first device using a communication network or internet to control the plurality of electronic devices.

Referring to FIG. 1, an IPTV system may include a first device such as a client consumer electronics device 12, a second device such as another consumer electronics device 38, an electronic device 29 connected with the first device, a management server 30, a proxy server 34, and a content server 32. Each of the above devices and servers may have both a wired communication interface and a wireless communication interface.

The client consumer electronics device (CE) 12 such as a TV, game player, video disk player, camera, digital clock radio, mobile telephone, personal digital assistant, laptop computer, etc. includes a portable lightweight plastic housing 14 bearing a digital processor 16. The processor 16 can control a visual display 18 and an audible display 20 such as one or more speakers. The client consumer electronics has a unique identifier that, without other means, is able to identify the client consumer electronics within the IPTV system. The unique identifier may be assigned by a manufacturer or assigned by the management server when the client consumer electronics is registered in the IPTV system.

To undertake present principles, the processor 16 may access one or more computer readable storage media 22 such as but not limited to RAM-based storage (e.g., a chip implementing dynamic random access memory (DRAM) or flash memory or diskbased-storage. Software code implementing present logic executable by the CE device 12 may also be stored on one of the memories shown to undertake present principles.

The processor 16 can receive user input signals from various input devices including a remote control device 24, a point and click device such as a mouse, a keypad, etc. A TV tuner 26 may be provided in some implementations particularly when the CE device is embodied by a TV to receive TV signals from a source such as a set-top box, satellite receiver, cable head end, terrestrial TV signal antenna, etc. Signals from the tuner 26 are sent to the processor 16 for presentation on the display 18 and speakers 20.

As shown in FIG. 1, a network interface 28 such as a wired or wireless modem or wireless telephony transceiver communicates with the processor 16 to provide connectivity to a wide area network such as the Internet. Double arrows in FIG. 1 indicate network communication between components over wired and/or wireless links. In this way, the client device 12 can communicate with a management server 30 on the Internet and with one or more content servers 32, also on the Internet and communicating with the management server 30.

If desired, each content server 32 may be associated with a respective proxy server 34 which interfaces the content server 32 with the device 12. The servers 30, 32, 34 have respective processors 30a, 32a, 34a accessing respective nontransitory computer readable storage media 30b, 32b, 34b which may be, without limitation, disk-based and/or solid state storage. The servers communicate with a wide area network such as the Internet via respective network interfaces 30c, 32c, and 34c. It is to be understood in view of disclosure below that the CE device 12 particularly when implemented by a non-PC device such as a TV or game console or camera can communicate only with the management server 30 and with content servers 32 that appear on a service list provided to the processor 16 by the management server 30, with the service list not being modifiable by the processor 16.

The electronic device is connected with the first device 12 using a cable such as a 1394 cable or a HDMI cable or using a wireless communication interface such as infrared signals. The electronic device may be a digital video recorder, a Blu-ray player, a game player, an audio amplifier, or an air conditioner. Storage may be any suitable electronic storage, such as RAM, ROM, EEPROM, or other storage medium, or cloud-based storage using local or remote storage via a network, such as storage at a remote server.

A second device 36 may be another consumer electronics device. The second device 36 may be another TV, game player, video disk player, camera, digital clock radio, mobile telephone, personal digital assistant, laptop computer, etc. The second device 36 with a housing 38 bears a digital processor 40 controlling a visual display 42 and an audible display 44 such as one or more speakers. To undertake present principles, the second or control processor 40 may access one or more computer readable storage media 46 such as but not limited to RAM-based storage (e.g., a chip implementing dynamic random access memory (DRAM) or flash memory or disk-based-storage. Software code implementing present logic executable by the second or control device 36 may also be stored on one of the memories shown to undertake present principles. Further, the second or control processor 40 can receive user input signals from various input devices 48 including a point and click device such as a mouse, a keypad, etc. A network interface 50 such as a wired or wireless modem or wireless telephony transceiver communicates with the processor 40 to provide connectivity to a wide area network such as the Internet.

FIG. 2 shows an example embodiment of present principles for enabling a user to use a second device 36 to browse assets and select one to have a first device 12 such as a main IPTV client play the content (the IPTV client is also referred to as an IPTV client device and/or an IPTV device and/or IPTV, herein). FIG. 2 assumes that the user has already created an account with the management server 30 and has affiliated the main IPTV device with that account. In general, a user loads the web application in the second device and logs into their user account, which may be the same account used for device registration. Once logged in, a list of compatible IPTV devices is presented. After the user selects a device, a list of services that the device is entitled to is provided. The user browses the services and their content, in his/her preferred language, on the second device as though it is an actual IPTV device such as the first device. Similar transactions, like video rentals or home shopping purchases, can also be made on the second device. Standard IPTV system interaction with service providers occurs on the proxy server, hence creating a firewall between the second device and content providers. Additional navigation features, like hyper-linked text which will open a new window and the management of premium services from a single location, provide better user experience in this IPTV system.

When a piece of content is selected, it may be sent to the IPTV for command execution (i.e., playback) in the form of a reference id which is used by the IPTV to retrieve content information. By eliminating the presence of the content URL on the second device, the risk of leaking major proprietary information which could result in huge losses is reduced. During the time of playback, the user can continue to browse for other content and queue it for future playback. The IPTV needs to be addressable by the second device to perform playback, which is the case when both devices are on the same local network. The user can also switch devices and resume playback on a different device such as the electronic device 19 in FIG. 1 by going to the recently viewed list and selecting the last video played after switching control to that device.

A detailed description of each state in FIG. 2 is provided as follows.

At state 52 a user turns on the first device 12, hereafter referred to as the "IPTV client" for convenience. At state 54 the IPTV client sends login information including, e.g., user name and password to the management server 30, which at state 56 returns to the IPTV client an IPTV session token that may subsequently be presented by the IPTV client device to a participating content server 32 to obtain content from that server. Also, the management server 30 stores the local location (IP address or IP address and port number) of the IPTV client device 12. Alternatively, in another embodiment, the management server 30 does not return a token in response to receiving login information. Subsequently, no token is required to be presented by the IPTV client device to the participating content server 32 to obtain content.

At state 58, the user instantiates an IPTV client control utility on the second device 36. The utility executed on the second device 36, at state 60, sends a request to the proxy server 34, which returns (62) a response in a suitable language, such as hypertext markup language (HTML) with JavaScript for the second device 36 to execute in accordance with description below. This JavaScript makes asynchronous JavaScript and extended markup language (XML) (AJAX), or other suitable language, calls to the proxy server and to the IPTV client device to obtain information to control the IPTV client device. In another embodiment, step 60 may not be necessary where other client application implementations are used, such as one where the client application is not downloaded each time it is used. It should also be noted that other technologies (e.g. C, C++, Perl, and Flash) can be used for the implementation of the client application and that neither HTML nor JavaScript are required.

With more specificity, at state 64 using the JavaScript, or other suitable scripting language, received from the proxy server 34 the second device 36 prompts the user to input to the second device 36 the account login information, including, e.g., the same user name and password that the IPTV client device provided to the management server 30 at 54. Thus, the servers 30, 32, 34 communicate necessary account information between them as needed to realize present principles.

At state 66 the proxy server 34, responsive to a correct user name and password from the second device 36, returns information about all IPTV clients 12 that are affiliated with the user account including their local IP addresses which were stored by the management server 30 after login at 54 (and subsequently provided to the proxy server 34).

When the user inputs to the second device 36 at state 68 a selected IPTV client device (in this example, the IPTV client device 12) to use with the second device, the second device 36, using the local IP address returned at state 66, accesses the IPTV client device 12 directly. The second device 36 requests information about the IPTV client device 12 at state 70, including language information, rating information, digital rights management (DRM) information, etc. as desired, which information is returned from the IPTV client device 12 to the second device 36 at state 72. Since the second device 36 knows the IP address of the IPTV client device 12 and consequently communicates directly with the IPTV client device 12, the second device 36 communicates using a local web address of the IPTV client device 12 that need not be globally addressable, and may so communicate as long as the second device 36 and IPTV client device 12 are on the same local network.

At state 74 the second device 36 sends the client information received at state 72 to the proxy server 34, requesting a list of services available to the IPTV client 12 from one or more of the content servers 32. The proxy server 34 relays the request for a list of services at state 76 to the management server 30, which returns the requested service list at state 78 to the proxy server 34. The proxy server 34 in turn sends the services list to the second device 36 at state 80 for presentation of available services on, e.g., the second device display 42.

State 82 indicates that a user can input (using, e.g., the second device input device 48) a selection of a service on the list that was returned to the second device at state 80. In response, the second device 36, at state 84, sends a request for a list of content and categories to the proxy server 34 along with a service session token that the second device may have received from the content server 32 via the management server 30.

Responsive to the request, at state 86 the proxy server logs into the service of the content server 32 providing the selected service. At state 88 the content server 32 provides to the proxy server 34 a service session token for the particular content server 34. State 90 indicates that if desired the proxy server 34 may also request a list of content and categories of the content server 32, and the list is returned at state 92 in, e.g., extended markup language (XML) format to the proxy server 34, which relays the assets, categories, services, etc. available for selection to the second device 36 at state 94. When the list of assets or the list of options is provided to the second device, the URL associated with each asset or options are removed. A reference ID is added to the list for each asset and options. The second device requests a particular asset or option by using the reference ID. In this way, the second device may not obtain any URL of the assets or options.

The content available for selection is presented on the second device display 42 so that the user can navigate (96) the display to enter (98) a selection. Responsive to the selection the second device 36 at state 98 sends a command to the IPTV client 12 to play the selection. At state 100 the IPTV client device 12 then requests service information of the management server 30 information about the service the selected asset is in, logging in to the service if required. The requested information is returned from the management server 30 to the IPTV client 12 at state 102, and when the IPTV client 12 receives the asset information it plays the asset at state 116. Note that if the IPTV client is already playing content the new content commanded to be played by the second device is placed in a queue in the IPTV client and played when the current content completes.

Note further that the second device may command the IPTV client to play content by sending to the IPTV client over the home network commands coded as if they were sent from an infrared remote control (IR RC), specifically for example the commands may be in Sony® Infrared Remote Control System (SIRCS) protocol. The second device may transmit command signals to the IPTV client to control the electronic device 29.

As shown in FIG. 2, if desired, temporally between states 102 and 106 a series of messages may be exchanged between the IPTV client device 12 and the content server 32. For example, a request for content information may be made (104) by the IPTV client device 12 and returned (106) by the content server 32. The above-described logging into the service may be relayed by the IPTV client 12 to the content server 32 at state 108 and a service session token is returned to the IPTV client at state 110 along with the before-mentioned asset information. Also, a request of content information may be made (112) and a playlist returned to (114) the IPTV client 12.

The software (e.g., JavaScript/HTML software) that is downloaded at state 62 can be made available to all electronic vendors who wish their users to be able to navigate, browse, and search IPTV content on a second device. In an embodiment in which HTML is used, the software can be used on any client device with a web browser.

The following situations illustrate some scenarios where the second device complements the IPTV's shortcomings, hence providing better user experience for the IPTV user. For example, a group of friends is watching video clips on an IPTV. Each of them are browsing content on their own Second Display and queuing up selections. In another example, someone is looking for content on a particular subject. They are able to quickly type in search terms using their second device even when those terms contain characters not supported by their IPTV. In another example, a man is watching the end of a ball game on the IPTV while his wife uses a Second Display to select a movie for them to watch when the game ends. In another example, a user may be away from an IPTV, but the user may use a smart phone as the second device to browse contents and select a preferable content to be play on the IPTV.

In the above-identified situations, using a second device can provide many benefits, such as:

Browsing in own language without disturbing the big screen
Ease of data entry in a language not supported by the IPTV
On-device service affiliation for premium services like Netflix
Cross-device playback and resume from a recently viewed list
Social sharing of content to enhance content proliferation
Management of subscription-based services from a single location
Browsing and queue management on the move
One-click Customer service without the need of entering personal or device information
Quick access to relevant device specifications and manuals
Hyper-linked text in forms directs users to informational sites
Content Queue across devices
Advertisement revenue through Second display usage The second device provides an enhanced user experience of the IPTV without adding to the hardware costs of the unit, making data entry easy and allows users to browse content on the side. IPTV is also a global solution which connects various IPTVs together in a cohesive manner through its potential of initiating playback across devices and also provides the highest level of customer service to users through its one-click customer service feature, where users do not even need to provide any device information which can be difficult to retrieve in the event of a device breakdown.

Figure 3:
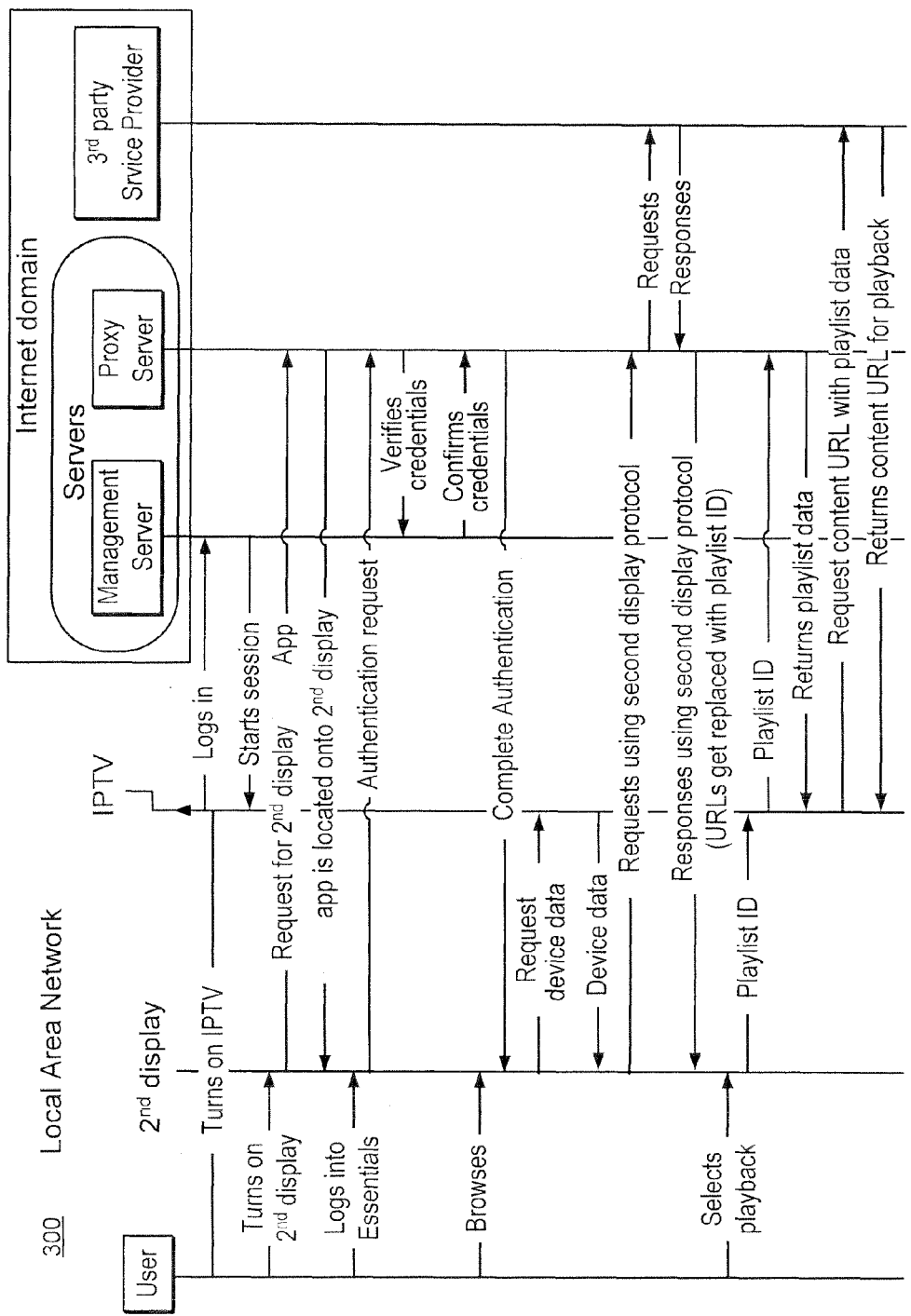
FIG. 3 shows a schematic representation of an embodiment of the present invention.

FIG. 3 shows a schematic representation 300 of an embodiment in which the present invention finds ready application. First a user turns on an IPTV client. After the user logs in on IPTV into the manager server using the device credentials, a session is started. Then the user turns on the second display device, and requests for a second display application (app) to proxy server (this can be a remote or local server). The application (native/interpreted application) is loaded onto second display. Then the user logs into the application using account information, the account is the same account used for IPTV to log in as described above (however, this is not the same account credential). An authentication request is sent from the second display to the proxy server. The proxy server verifies credentials with the management server, and then the management server confirms credentials with the proxy server. So that authentication is completed.

Then the user browses an Internet video link (IVL). After that, the device data is requested from the second display and then the requested device data is sent from IPTV client to the second display. The second display sends a request using second display protocol to the proxy server, and then the proxy server requests to service provider, and the service provider responds. The proxy server responds using a second display protocol to the second display with the associated URL replaced with playlist ID.

After the user selects playback, the second display device attempts to send the playlist ID to the IPTV client device. When the IPTV client device is reachable, the playlist ID is received. Then the playlist ID is sent from the IPTV client device to the proxy server, and playlist data is returned from the proxy server to the IPTV client device. The IPTV client device requests a content URL with playlist data of the service provider, and then the service provider returns the content URL for playback to the IPTV client device. When the IPTV client device is not reachable, the playlist ID is not received and the second display device notifies the user that the IPTV client device is not reachable. The second display device stores the Playlist ID for a later attempt at sending to the IPTV client device.

In another embodiment, the second display device may inform a server of the playlist ID and when the IPTV device is connected to the server, may receive the request even when the IPTV device and the second display device are on separate local networks and cannot address each other. In this case, the IPTV device may still not be reachable, as in a case where the IPTV device may not be connected to a power supply, and the request is queued at the server to be sent at a later time when the IPTV device is reachable.

Figure 4:
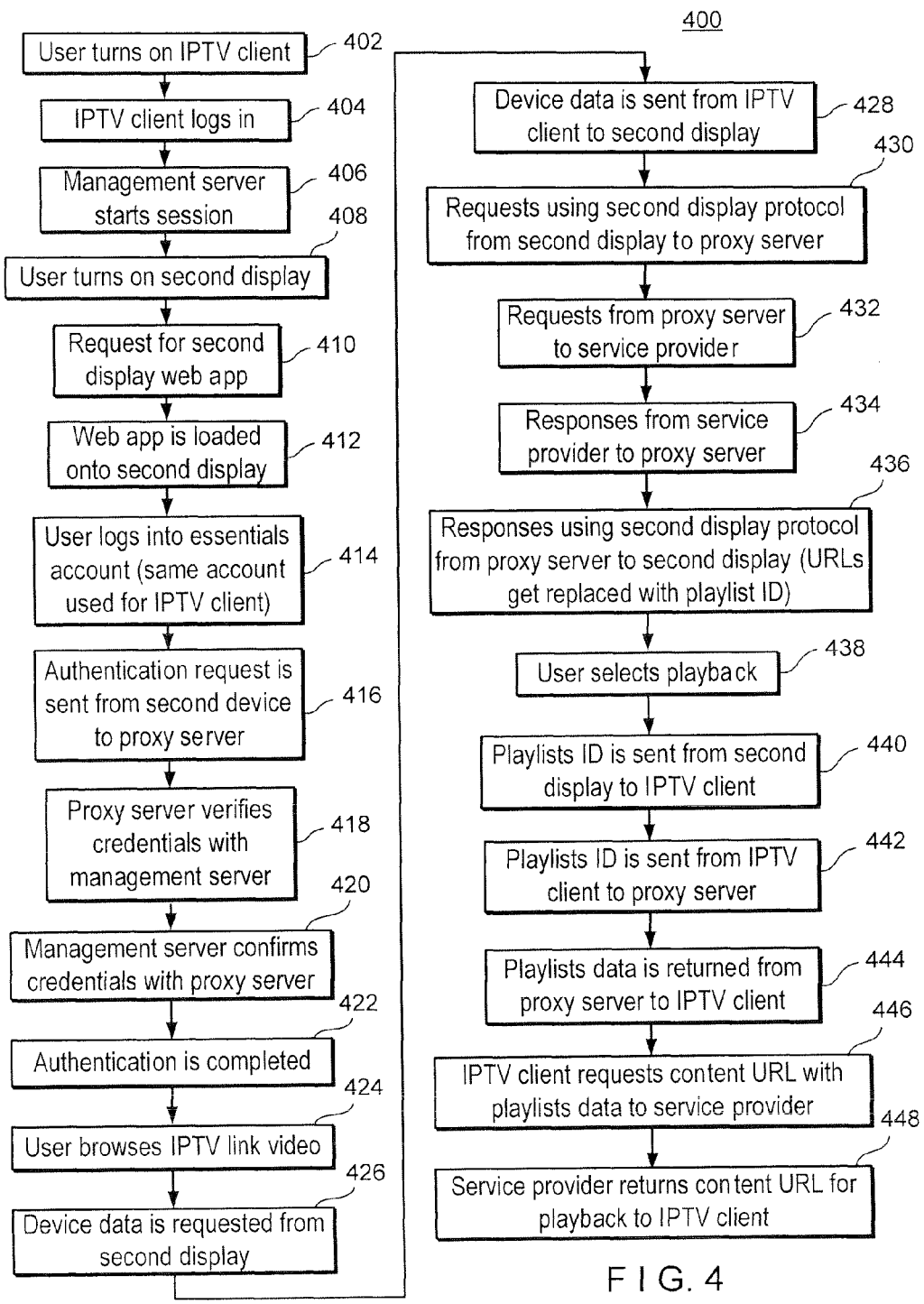
FIG. 4 shows a flow chart of processing steps according to an embodiment of the present invention.

FIG. 4 shows a flow chart 400 of processing steps according to the embodiment of FIG. 3.

The process begins in step 402 in which the user turns on IPTV client device. After the IPTV client device is registered with the management server, or authenticated with the management server, as shown in step 404, the management server starts the session in step 406. Then in step 408 the user turns on the second display, and, when necessary, requests for second display application to a proxy server, as shown in step 410. The request for the second display application is optional. In some embodiments of the present invention, the second display will receive the second display application every time the application is started, while it is also an embodiment of the present invention that the second display device will not receive the second display application or only on a software update. When requested, the application is loaded onto second display in step 412. In step 414 the user logs into the account, which is the account the IPTV device is registered to. In step 416 an authentication request is sent from the second display to the proxy server. In step 418 the proxy server verifies credentials with the management server, and then in step 420 the management server confirms credentials with the proxy server. In step 422 authentication is completed. It is an embodiment of the present invention that the server in steps 418 and 420 may be in the same server. Alternatively, there may be more than two servers splitting the server tasks.

In step 424 the user is presented with a list of IPV devices affiliated, or associated, with the secondary display device via the user account. In step 426 when a user selects a particular IPTV device to communicate with, an application program interface (API) is sent to the selected IPTV device, device data, describing the second display, is requested by the second display device and in step 428 the requested device data is sent from the IPTV client to the second display, this information may include information specific to the IPTV device such as content rating permitted by that device, language, etc. In an embodiment in which the user has already selected an IPTV device in a previous session, an API call may be sent to that IPTV device to obtain device information without the user making a request. Also, according to an embodiment of the present invention, the user may set a particular IPTV device as the default device in a list of IPTV devices. In step 430 the second display makes requests using a second display API to the proxy server for options, categories and content list, and then in step 432 the proxy server in turn requests them from the service provider and the service provider responds, with options, categories and content list, as shown in step 434. In step 436 second display receives categories, options and content list from the proxy server and displays them for the user. Alternatively, the proxy server may send to the second display device the playlist ID associated with the URL to replace the URL. Alternatively, the service provider may permit, in some cases, that the URL is sent to the second display device. For example, the second display may have a secure application, and the service provider may allow a second display with a secure application to receive the URL. Thus, the content URL may be transmitted to the IPTV device for playback, rather than having the IPTV device retrieve the data from the server.

In step 438 the user selects content for playback and a playlist is created for that content and stored in the proxy server. Then in step 440 a playlist ID is sent from the second display device to the IPTV client device. If the IPTV client does not answer or does not acknowledge the request to play the content, or is unable to play the content at the time, such as when the IPTV client device may be on and reachable, but a viewer has enacted a "do not disturb" mode, the second display device informs the user that the IPTV client device is unreachable (not available to play the content at this time) and queues the request to be repeated at a later time when the IPTV client device is reachable. In step 442 the playlist ID is sent from IPTV client to proxy server, and returned from proxy server to IPTV client in step 444. In step 446 IPTV client requests content URL with playlist data to service provider, and then in step 448 the service provider returns content URL for playback to the IPTV client. Alternatively, the proxy server may store the URL content and thus, return the URL content to the IPTV client device without the need to request the content at the URL associated with the playlist data from the service provider. Thus, when the proxy server stores the URL, step 446 is not used, rather, once the IPTV client device obtains the URL, the IPTV client device can start playback.

Figure 5:
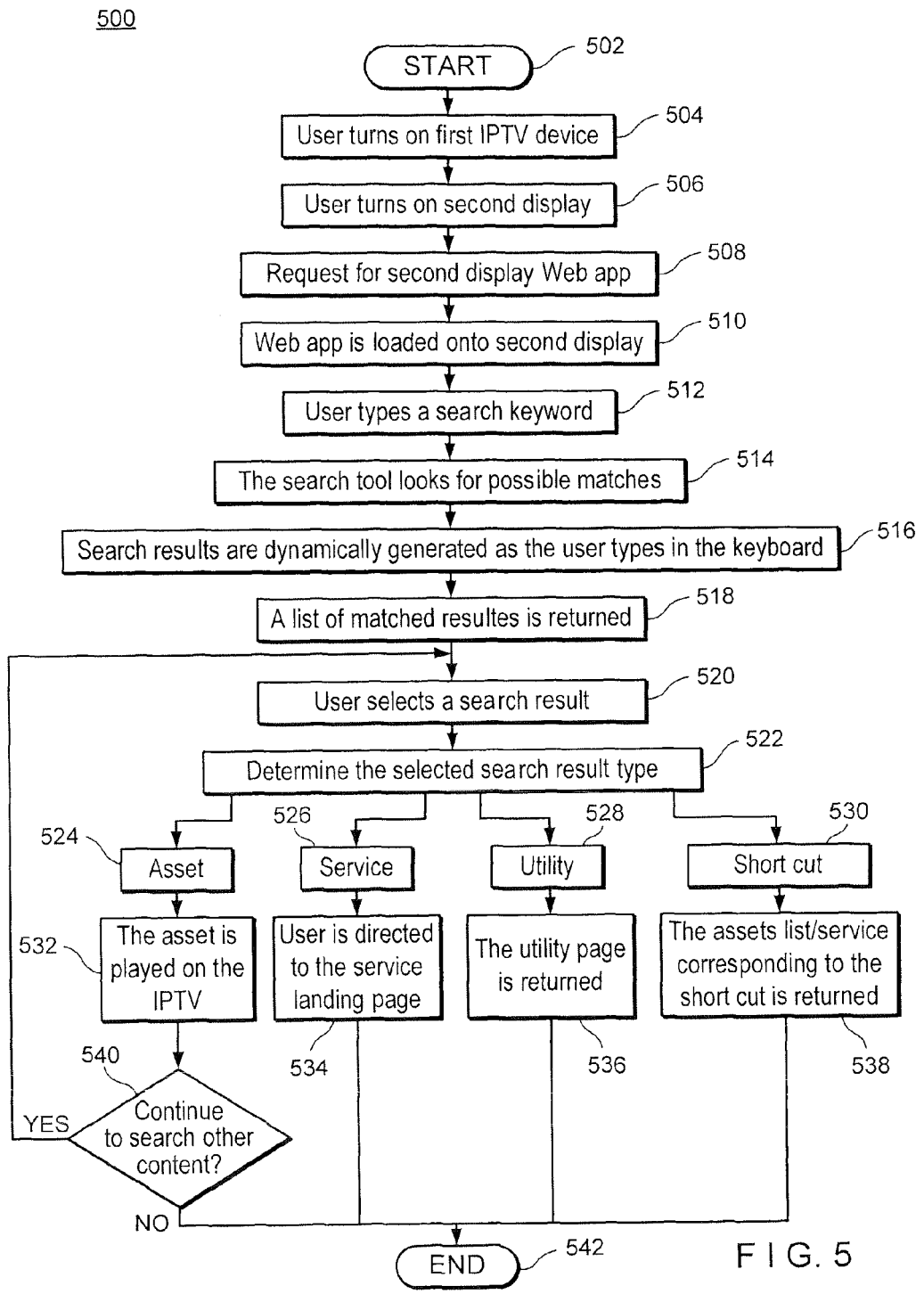
FIG. 5 shows an example of steps for a user to utilize a global search tool on a second display, according to an embodiment of the present invention.

As shown in FIG. 5, the process 500 begins, as shown in start step 502. A user, who can access a first IPTV device and a second display device, which may or may not be an IPTV device, turns on the first IPTV device, as shown in step 504, and turns on the second display device, as shown in step 506. It is to be noted that, the user's operation of turning on the first IPTV device in step 504 is optional as the user may still be able to select that IPTV device on the second display device and to perform searching even when the selected IPTV device is turned off. Then the user requests the second display application (which may be, for example, web or native application) from a proxy server, as shown in step 508. The second display application is loaded onto the second display device, as shown in step 510. Because the second display application can be written in HTML, it can be loaded by any suitable device with browser capability. Hence, the second display application may be utilized with any compatible device. It is to be noted that, the second display application may not necessarily be written in HTML or even be designed to run in a web browser. Furthermore, the second display application may not necessarily be a web application; for example, it could be native code, Java, Flash or written in any code known to those of ordinary skill in the art.

As shown in step 512, the user types a search keyword, which may contain characters not supported by the IPTV device, and then the entered search keyword is transmitted over the network to the search tool which in one embodiment, runs on a server instead of on the second display device. The search tool has access to information about the content offered by each of the services available on the IPTV device and can query that information to determine the assets to be included in the search results returned to the user. The search results may be in the form of an assets list returned to the second display device. The "assets" in this list may be playable assets played or reproduced on the IPTV device when selected. The "assets" may also be services, short cuts to categories in a service, or utility programs. Alternatively, the "assets" may be executed with a command or set of commands. For example, an "asset" in an asset list may be recommended, favorite, queued, discussed and/or shared, which are all non-playable functions. Thus, as shown in step 514, the search tool determines possible matches of the keyword entered in step 512 in the assets of a current assets list or a cached assets list, service list, utility list, shortcut list, or any other stored or searchable data that the search tool can access, such as, for example, title, artist, genre, year, rating, and/or keywords. The assets lists, service lists, utility lists, shortcut lists, etc, include contents from one or more service providers. The contents are dynamic and changing and the assets lists, service list, utility list, shortcut list, etc, are stored in the user's account, instead of the device's account. Thus, once the user logs into his/her account, he/she can search in the current or cached lists across all the IPTV devices linked to his/her account.

As shown in step 516, the search results are dynamically generated as the user types in one or more keywords. As shown in step 518, the search tool returns a list of matched results. The user selects a desired search result, as shown in step 520. As shown in step 522, a determination is made according to the type of the search result selected by the user.

As shown in step 524, if the selected search result is an asset, which could be returned from an assets list, a favorite list, a recently viewed list, or any other suitable list, the second display device requests the IPTV device to play the asset, as shown in step 532. Alternatively, the asset may be played on the second display or any other device that is operatively coupled to the user's account.

In one embodiment, during the time of playback on the IPTV device, the second display continues to display the search results, which can be further navigated by the user on the second display. The user may continue to enter new search terms or search for other content on the second display, and then select and queue the content for future playback without interfering with the playback of the selected asset, which is currently being played by the IPTV device. Thus, as shown in step 540, a determination is made whether the user wants to continue to search other content. If more searching is desired, "yes" line leads back to step 520 and the user may make another selection from the search results. If no additional searching is desired, "no" line leads to end step 542. In addition, if the user wants to type a new search keyword, the search form may be navigated to and repeated on the results page, allowing the user to directly enter another search keyword.

If the selected search result is a service, as shown in step 526, the user may be directed to the service landing page, such as the home page of the service and the second display device begins displaying the content available from that service, as shown in step 534. The second display device allows the user to navigate through the content from that service as if the service was selected from a list of services to browse.

If the selected search result is a utility, as shown in step 528, the utility page may be returned to the second display, as shown in step 536. A utility page is a reference to another page within the application, which may be downloaded and run as part of the second display application if the utility is selected. This feature may be used for setting preferences and other similar functions.

If the selected search result is a shortcut, as shown in step 530, depending on what kind of shortcut is returned, for example, an assets list or a service, the assets list or service corresponding to the shortcut may be returned to the second display as if the shortcut has been accessed from the shortcuts list itself, as shown in step 538. For example, if the shortcut is a reference to a category in a service, when the user selects the shortcut, the second display device navigates to that category in the service, and displays the list of assets in that category for the user to navigate.

A description of various embodiments is provided. These embodiments are shown in the various figures herein. One embodiment of the present invention is directed to a method ("the method") for searching content using one or more user devices. The user devices may be, for example, cellular telephones, personal digital assistants (PDAs) or any suitable hand-held processing device. The user device also referred to herein as a secondary device may or may not be an IPTV device and typically has one or more ports that can interface with peripheral devices such as printers, memory cards, or other electronic memory; wireless connections such as Ethernet, Internet, or Bluetooth; input devices, such as key boards, track balls, computer mouse, jog dials and other suitable input modules. The user, using a user device can request an application from a service provider and access the requested application using the user device. The user can then use the user device to search assets, services, shortcuts and utilities. While the user device is used to perform the searching operation, the results of the search can be displayed using an IPTV device that the user can select. The searching can be performed using content in a current content list and/or a cached content list provided by a service provider. Once the search is complete, a search result list containing search results can be generated. The user can then select a search result from the search result list and accessing the selected search result. The search result can be accessed using either the user device or the IPTV device, depending on how the user wishes to view the results.

Another embodiment of the present invention is directed to the method described above and also includes displaying the selected search result utilizing one or more other user devices.

Another embodiment of the present invention is directed to the method described above and also includes identifying an IPTV device for displaying the search result list and/or the search result.

Another embodiment of the present invention is directed to the method described above and also includes using the input search criteria that contains characters different than characters supported by the IPTV device. Thus, the user device can utilize input characters and features and peripheral input devices, such as key board, mouse, track ball and/or jog dial that may not be available on the IPTV device. The user can have more flexible searching because the user device used for searching can accept a wider range of characters.

Furthermore, as stated previously, the user device can communicate, via one or more ports, with other external devices, such as printers, scanners, input keyboards, jog dials, computer mouse, speakers, voice input modules, facsimile machines and other locations, such as Ethernet locations, Internet locations, Bluetooth locations, uniform resource locators (URLs), uniform resource identifiers (URIs), the user device can receive a wide variety of inputs for search criteria. For example, the user can connect a scanner to the user device to scan an image. The scanned image can then be used to perform a search, such as techniques used by BITSTREAM™, PixID™ and other image searching techniques. Furthermore, a user can input one or musical notes to search for a particular song or musical composition. Additionally, the text information may be obtained by a speech-to-text process based on speech information input by the user. Additionally, the search criteria may be input in a first language, such as English, and selected search results are provided in a second language, such as French. In yet another embodiment of the present invention, the search criteria may include hyperlink information or information from other sources, such as a friend's list, or the Internet.

Another embodiment of the present invention is directed to the method described above and the content list is dynamically updated by the service provider. Thus, as the service provider obtains additional content, such as movies, songs, and other data, this content is available to the users.

Another embodiment of the present invention is directed to the method described above and wherein the generated search result is dynamically generated as the user inputs the search criteria.

Another embodiment of the present invention is directed to the method described above wherein the current content list and the cached content list include one or more of a service list, utilities list, a shortcuts list, or an assets list. A service list includes a list of locations, such as webpages, landing pages or other addresses. A utilities list includes a listing of utility pages from which a user may select. A shortcuts list includes a list of abbreviations, or shorthand notations for content. An assets list includes a list of assets, such as movies, video, music, or other content that a user may wish to view.

Another embodiment of the present invention is directed to the method described above and also includes selecting an IPTV device from one or more IPTV devices linked to a user's account. The selected IPTV device can be used to play an asset. While the IPTV device is playing the asset, or is other being operated, the user is free to search for other content, or perform additional searching, or make additional selections, or queue future selections, without disrupting operation of the IPTV device.

Another embodiment of the present invention is directed to the method described above and also includes identifying an IPTV device suitable for displaying an asset and providing instructions to the user device, from the service provider, to enable the user device to control the IPTV device. These instructions may be, for example, in the form of metadata.

Another embodiment of the present invention is directed to the method described above and also includes attempting to identify one or more IPTV devices that are reachable (available for communication) and associated with a user's account. If there are no reachable IPTV devices, then a server device is used to manipulate the selected search result. Thus, when an IPTV device is not reachable, the secondary device may communicate with a server device to determine when an IPTV device will be reachable. Thus, the user will be able to determine what asset can be displayed at a particular time using an available IPTV device.

According to embodiments of the present invention, when the user utilizes the search tool, he/she may, or may not, provide any device information. The device information can be difficult to retrieve if a device breaks down. Thus, the searching function as described herein provides an enhanced service to users through its one-click feature.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying figures, as shown herein, can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A method for searching content using one or more first user devices for display on one or more other user devices, the method comprising:

logging into a user's account using a first user device;

authenticating the first user device;

requesting an application from a service provider, utilizing the first user device;

accessing the requested application using the first user device;

requesting device information about all the one or more other user devices linked to the user's account, the device information including IP addresses of all the one or more other user devices linked to the user's account, utilizing the first user device;

obtaining the requested device information about the one or more other user devices;

inputting search criteria using the first user device;

searching, using the first user device, for search results corresponding to the search criteria among content included in a current content list and a cached content list that are stored in the user's account linked to all the one or more other user devices;

generating a search result list containing search results according to the input search criteria;

selecting a search result from the search result list;

determining a search result type, the search result type selected from the group consisting of (asset, service, utility, and shortcut);

sending a command, from the first user device, to the one or more other user devices to present the selected search result; and selecting a particular search result type;

accessing the selected search result to be presented on the one or more other user devices based on the particular search result type without interrupting the searching by the first user device, wherein when the particular search result type is:
  a. an asset then the asset is played on an IPTV linked to the user's account;
  b. a service then the first user device is directed to a service landing page;
  c. a utility then the utility page is returned to the first user device; and
  d. a shortcut then assets or services associated with the shortcut are returned to the first user device, wherein if the one or more other user devices receives the command to present the selected search result when a prior search result is being presented on the one or more other user devices, the selected search result is placed in a queue in the one or more other user devices and presented when presentation of the prior search result is completed.

2. The method according to claim 1, further comprising: identifying an IPTV device for displaying the search result list and/or the search result.

3. The method according to claim 2, wherein the input search criteria contains characters different than characters supported by the identified IPTV device.

4. The method according to claim 2, further comprising: authenticating the identified IPTV device.

5. The method according to claim 1, further comprising: identifying an IPTV device used to display the search result list and/or the search result, the IPTV device having an input module, wherein the input search criteria includes characters not available to the input module of the IPTV device.

6. The method according to claim 1, wherein the content list is dynamically updated by the service provider.

7. The method according to claim 1, wherein the generated search result is dynamically generated as the user inputs the search criteria.

8. The method according to claim 1, further comprising: selecting an IPTV device from one or more IPTV devices associated with a user's account; and
logging into the user's account using the selected IPTV device.

9. The method according to claim 1, wherein the current content list and the cached content list include one or more of a utilities list, a shortcuts list, a service list or an assets list.

10. The method according to claim 9, further comprising: selecting a utilities list; and
presenting a utility page utilizing the first user device.

11. The method according to claim 9, further comprising: selecting a shortcuts list; and
presenting content corresponding to the shortcuts list utilizing the first user device.

12. The method according to claim 11, wherein the content corresponding to the shortcuts list is an assets list or a service list.

13. The method according to claim 9, further comprising: selecting a service list; and
presenting a landing page associated with the service list.

14. The method according to claim 1, further comprising: selecting an IPTV device from one or more IPTV devices linked to a user's account,
wherein when the selected search result is an asset, the asset is played on the selected IPTV device.

15. The method according to claim 14, further comprising: inputting new search criteria using the first user device or another IPTV device without disrupting operation of the IPTV device.

16. The method according to claim 14, further comprising: selecting a new search result from the search result list that is presented on the first user device without disrupting operation of the first IPTV device.

17. The method according to claim 16, further comprising: queuing the new selected search result for future playback without disrupting operation of the first IPTV device.

18. The method according to claim 1, further comprising: identifying an IPTV device suitable for presenting an asset from the selected search result; and
providing instructions to the first user device, from the service provider, the instructions enabling the first user device to control the IPTV device.

19. The method according to claim 18, wherein the instructions are in the form of metadata.

20. The method of claim 1, further comprising: attempting to identify one or more IPTV devices that are reachable and associated with a user's account; and
utilizing a server device to manipulate the selected search result when an IPTV device is not reachable.

21. The method according to claim 1, wherein the search criteria is text information input by a user using the first user device.

22. The method according to claim 21, wherein the text information is obtained by a speech-to-text process based on speech information input by the user.

23. The method according to claim 21, wherein the text information is obtained by an image-to-text process based on image information input by the user.

24. The method according to claim 1, wherein the search criteria are input in a first language and selected search results are provided in a second language.

25. The method according to claim 1, further comprising: inputting scanned image data as the search criteria.

26. The method according to claim 1, wherein the search criteria includes hyperlink information.

27. The method according to claim 1, wherein the search criteria includes musical notes.

28. The method according to claim 1, wherein the search criteria includes information obtained from a user source.

* * * * *